United States Patent
Flynn

[15] 3,665,292
[45] May 23, 1972

[54] ELECTRIC SWITCHING CIRCUITS
[72] Inventor: Adrian Francis Flynn, Fenstanton, England
[73] Assignee: The General Electric Company Limited, London, England
[22] Filed: Sept. 23, 1970
[21] Appl. No.: 74,610

[52] U.S. Cl....................................................323/48, 323/62
[51] Int. Cl.......................................................H01f 29/00
[58] Field of Search..................317/DIG. 6, 155.5 A; 323/48, 323/62

[56] References Cited

UNITED STATES PATENTS 3,189,796   6/1965   Tipton...........................317/DIG. 6
3,215,858   11/1965   Harding et al. ..................317/155.5 A Primary Examiner—L. T. Hix
Attorney—Kirschstein, Kirschstein, Ottinger & Frank

[57] ABSTRACT

In a transistor switching circuit in which a transistor is connected selectively to energize a load circuit including an inductive element, for example an output transformer, and in which a rectifier element is connected across the inductive element in the sense to conduct in response to reverse voltages induced when the transistor switches to its non-conducting condition, an auxiliary winding coupled to the inductive element is connected in series with the rectifier element in a sense such as to oppose the induced reverse voltages, whereby the de-energizing time or recovery time of the inductive element is reduced.

2 Claims, 1 Drawing Figure

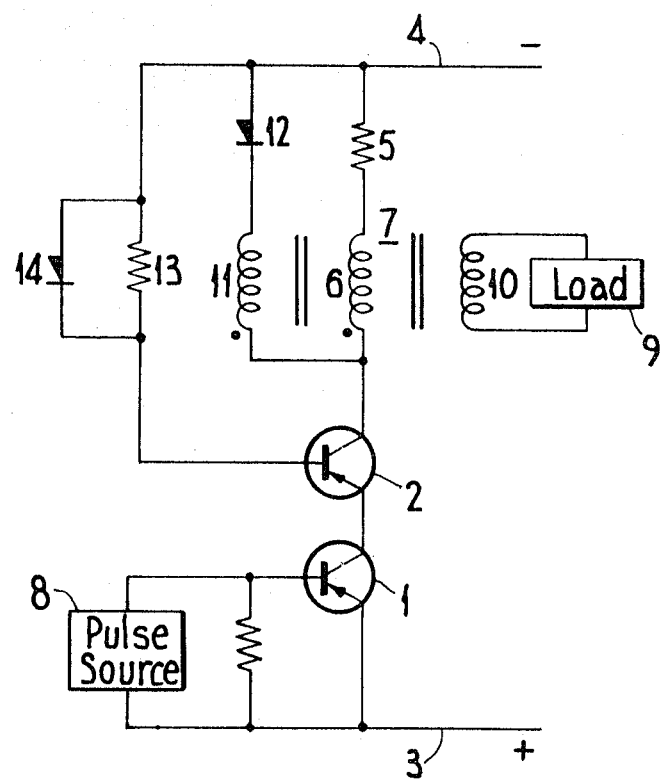

ELECTRIC SWITCHING CIRCUITS

The present invention relates to electric switching circuits.

When a transistor is used to switch on and off the current supply to an inductive load the output electrodes of the transistor may be subjected momentarily to voltages in excess of the supply voltage as the transistor is switched off due to the electromagnetic energy stored in the inductive component of the load. Such overvoltages, which may be sufficiently high to break down the junctions of the transistor, are commonly reduced by means of a rectifier element connected across the load in such a sense as to be non-conducting during the normal supply of current to the load and to conduct momentarily as the transistor is switched off, providing a shunt path to de-energize the inductive component of the load.

In a circuit such as described in the last paragraph, the energy stored in the inductive load when the transistor is switched off is subsequently dissipated in resistance that is effectively connected in series with the inductive load and the rectifier element at that time. The recovery (or decay) time is inversely proportional to the value of that resistance and one object of the present invention is to provide a circuit in which the recovery time for a given value of resistance is reduced. This object may be stated alternatively as enabling a lower value of circuit resistance to be used for a given recovery time.

According to the present invention in an electric switching circuit in which a transistor is arranged in operation selectively to energize an inductive load, there is provided a network which is connected across said load and which comprises a rectifier element in series with a winding which is inductively coupled to said inductive load, the circuit being arranged such that in operation when the transistor is conducting the rectifier element is non-conducting and when the transistor is rendered non-conducting the electromagnetic energy then stored in the inductive component of the load gives rise to a current flow through said rectifier element while the said winding is connected in such a sense that the resulting voltage induced therein tends to oppose said current flow.

An electric switching circuit in accordance with the present invention will now be described by way of example with reference to the accompanying drawing, which shows the circuit diagrammatically.

Referring to the drawing, the circuit comprises two p-n-p junction transistors 1 and 2 connected in series, the transistor having its emitter electrode connected to a positive supply line 3 and the transistor 2 having its collector electrode connected to a negative supply line 4 by way of a resist or 5 in series with the primary winding 6 of an output transformer 7. Signals from a switching pulse source 8 are applied to the base-emitter circuit of the transistor 1 so as to cause the transistors 1 and 2 to conduct and apply pulses to the load 9 by way of the primary winding 6 and a secondary winding 10 of the transformer 7. The collector electrode of the transistor 2 is also connected to the supply line 4 by way of a rectifier element 12 in series with a further secondary winding 11 of the transformer 7. The collector electrode of the transistor 1 is connected to the emitter electrode of the transistor 2, and the base electrode of the transistor 2 is connected to the supply line 4 by way of a resistor 13 and a rectifier element 14 in parallel.

The rectifier element 12 is connected with its anode nearer the negative supply line 4, while the primary winding 6 and the secondary winding 11 are connected in the same sense between the collector electrode of the transistor 2 and the negative supply line 4, that is, starting from say the collector electrode the two windings pass in the same direction about the common core (or the common flux path).

In operation when the transistors 1 and 2 are switched into conduction by a pulse from the source 8, current flows to the load 9 from the secondary winding 10 due to the build-up of current flow in the primary winding 10. In this particular example the load 9 may be largely resistive, the inductive component in the collector circuit of the transistor 2 being due to the transformer 7. While the transistors 1 and 2 are conducting energy is stored in the magnetic field set up in the transformer core.

During the normal flow of current to the load 9 the rectifier element 12 is reverse biased, so that substantially no current flows through this element 12 or the winding 11. When the transistors 1 and 2 cease to conduct, however, the energy stored in the magnetic field gives rise to potentials across the primary winding 6 which tend to forward bias the rectifier element 12. At the same time corresponding potentials developed across the secondary winding 11 are of such a sense as to tend to reverse bias the rectifier element 12. The winding 11 is arranged to have fewer turns than the winding 6, for example a fraction $n$ of the turns N of the winding 6.

The inductances L1 and L2 respectively of the primary winding 6 and the secondary winding 11 may be expressed as
$$L1 = KN^2$$
and $L2 = KN^2 n^2$
where $K$ is a constant.

The effective total inductance L at the instant when the transistors 1 and 2 are switched off is
$$L = K(N-Nn)^2$$
$$= KN^2(1-n)^2 = L1(1-n)^2$$

Since the energy stored in the magnetic field immediately before and after a supply current $I$ has been switched off by the transistors 1 and 2 must be the same, then
$$\tfrac{1}{2} L1 \cdot I_2 = \tfrac{1}{2} L1(1-n)^2 \, I^2/(1-n)^2$$
from which it may be seen that the effect of the further winding is to increase the demagnetize current to $I/(1-n)$. Neglecting the voltage drop across the rectifier element 12 the voltages around the loop are related by
$$VL1 = IR/(1-n) + VL2$$
where $VL1$ and $VL2$ are the voltages across the load and the further winding respectively and $R$ is the value of the resistor 5.

Since
$$VL2 = n\, VL1$$
$$VL2/n = IR/(1-n) + VL2$$
or
$$VL2 = IRn/(1-n)^2$$

The voltage $VL2$ represents the overvoltage to which the collector electrode of the transistor 2 is subjected.

In the absence of the winding 11 the recovery time of the collector load circuit, that is the time taken effectively to release the stored energy, is proportional to the ratio $L1/R$. Since the use of the further winding effectively reduces the inductance during the period after the transistors 1 and 2 are switched off the recovery time becomes proportional to $L/R$ or $L1(1-n)^2/R$. For a given recovery time it can be seen therefore that the value of the resistor 5 can be reduced considerably thus reducing the voltage drop for a given supply current or permitting higher load currents.

I claim:
1. An electric switching circuit comprising:
   A. a transistor,
   B. an output circuit for said transistor,
   C. means selectively to bias the transistor into a conducting condition,
   D. an output transformer having
      i. a first winding
      ii. a second winding and
      iii. a third winding,
   E. means connecting the first winding of said transformer in said output circuit of the transistor,
   F. load means connected in circuit with said second winding of said transformer,
   G. rectifier means, and
   H. means including said third winding connecting said rectifier means across said first winding in such a sense as to be reverse biased when said transistor is in said conducting condition,
   I. said third winding being connected in such a sense that voltages induced in said first and third windings are in opposition across said rectifier means.

2. An electric switching circuit in accordance with claim 1 wherein said means selectively to bias said transistor into a conducting condition comprises a second transistor having its major current path connected in series with that of the first mentioned transistor.

* * * * *